(12) United States Patent
Halloran et al.

(10) Patent No.: US 12,163,322 B2
(45) Date of Patent: Dec. 10, 2024

(54) ONE-PIECE TOILET WITH FLUSH VALVE

(71) Applicant: Kohler Co., Kohler, WI (US)

(72) Inventors: Daniel N. Halloran, Fredonia, WI (US); Tony L. Lambert, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 235 days.

(21) Appl. No.: 17/876,177

(22) Filed: Jul. 28, 2022

(65) Prior Publication Data
US 2022/0364344 A1   Nov. 17, 2022

Related U.S. Application Data

(63) Continuation-in-part of application No. 17/695,347, filed on Mar. 15, 2022, which is a continuation of application No. 16/869,936, filed on May 8, 2020, now Pat. No. 11,306,469.

(51) Int. Cl.
| | |
|---|---|
| *E03D 1/34* | (2006.01) |
| *E03D 1/33* | (2006.01) |
| *E03D 11/14* | (2006.01) |
| *F16K 31/18* | (2006.01) |

(52) U.S. Cl.
CPC ............. *E03D 1/34* (2013.01); *E03D 1/33* (2013.01); *E03D 11/14* (2013.01); *F16K 31/18* (2013.01)

(58) Field of Classification Search
CPC .... E03D 1/30; E03D 1/33; E03D 1/34; E03D 1/306; E03D 1/308; E03D 11/14; F16K 31/18

USPC ... 4/331, 378, 395–404, 252.1, 252.5, 252.6
See application file for complete search history.

(56) References Cited

U.S. PATENT DOCUMENTS

| | | |
|---|---|---|
| 2,744,258 A | 5/1956 | Harkness |
| 2,795,237 A | 6/1957 | Corbin, Jr. |
| 3,172,129 A | 3/1965 | Anthony et al. |
| 3,890,652 A | 6/1975 | Fulton |
| 4,433,446 A | 2/1984 | Grimstad |
| 4,604,763 A | 8/1986 | Sprang |
| 5,353,445 A | 10/1994 | Denzin |
| 5,848,442 A | 12/1998 | Denzin |
| 5,926,861 A | 7/1999 | Frost |

(Continued)

FOREIGN PATENT DOCUMENTS

WO    2013011454 A1    1/2013

*Primary Examiner* — Tuan N Nguyen
(74) *Attorney, Agent, or Firm* — Lempia Summerfield Katz LLC

(57) ABSTRACT

A toilet having a one piece structure, a flush valve, and a seal. The structure includes a base having a fluid channel in fluid communication with a bowl; a tank having an internal compartment; a wall disposed between the tank and the base, the wall having an opening fluidly connecting the internal compartment and the fluid channel; and a retaining structure in the internal compartment. The flush valve has a valve body including an inner wall, which is disposed in the opening and extends from a first end in fluid communication with the internal compartment to a second end in fluid communication with the fluid channel, and a locking flange extending radially outward from the inner wall, the locking flange being retained between the retaining structure and the wall in a locking position. The seal is disposed between the locking flange and one of the wall or the retaining structure.

20 Claims, 11 Drawing Sheets

(56) References Cited

U.S. PATENT DOCUMENTS

| | | | |
|---|---|---|---|
| 6,401,269 B1 | 6/2002 | Andersen et al. | |
| 6,874,172 B2 | 4/2005 | Frost | |
| 8,112,829 B2 | 2/2012 | Shieh | |
| 8,266,733 B2 | 9/2012 | Jensen | |
| 8,365,320 B1 | 2/2013 | Lordahl | |
| 8,806,669 B2 | 8/2014 | Halloran et al. | |
| 8,819,874 B2 | 9/2014 | Hand | |
| 9,695,581 B2 | 7/2017 | Shinohara et al. | |
| 11,306,469 B2 | 4/2022 | Halloran | |
| 11,674,296 B2 | 6/2023 | Halloran | |
| 2005/0060795 A1* | 3/2005 | Long | E03D 11/16 4/252.1 |
| 2006/0185068 A1 | 8/2006 | Halloran et al. | |
| 2007/0101485 A1* | 5/2007 | Denzin | E03D 1/33 4/378 |
| 2011/0203679 A1 | 8/2011 | Ravishankar | |
| 2013/0283513 A1 | 10/2013 | Hand | |

* cited by examiner

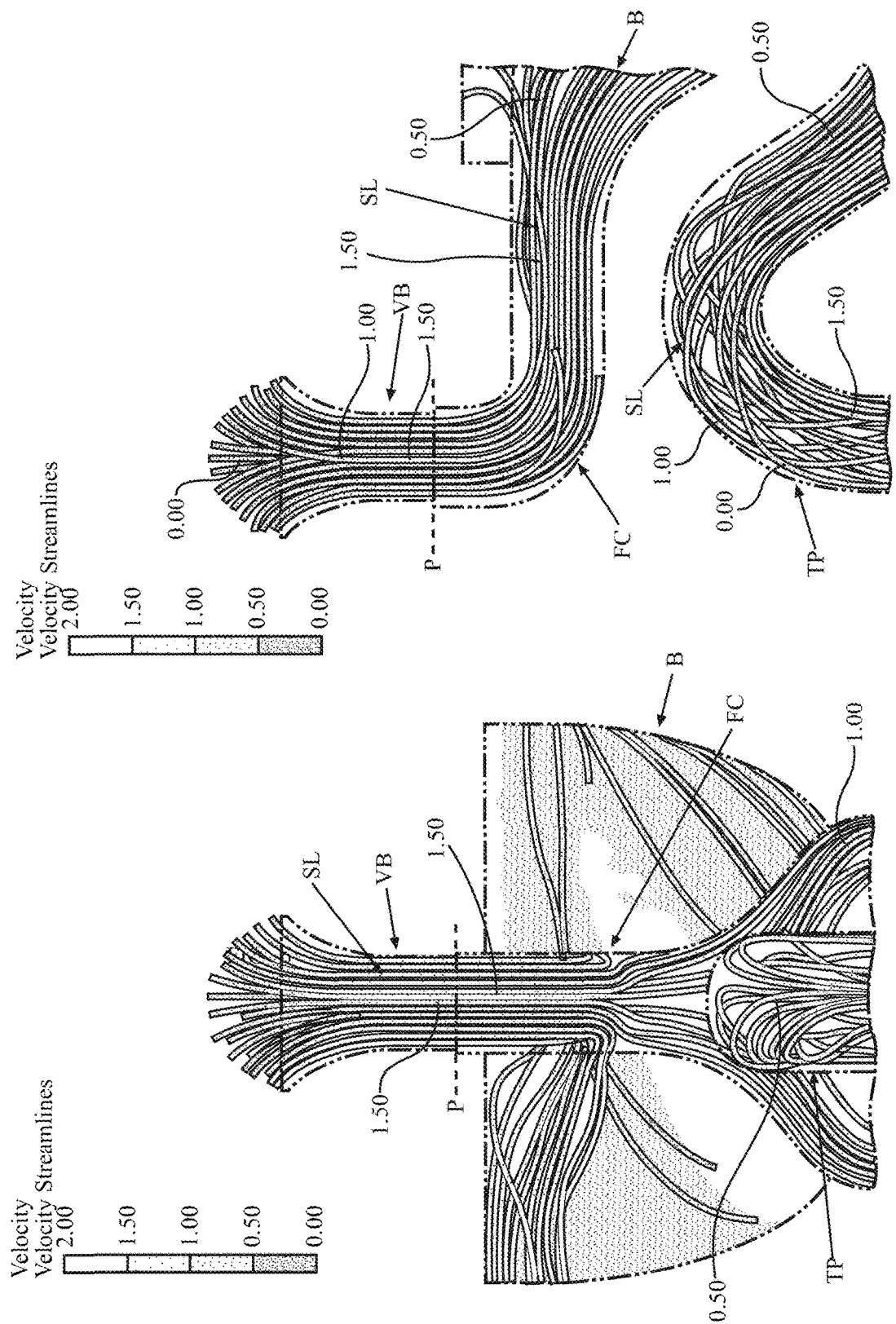

ONE-PIECE TOILET WITH FLUSH VALVE

CROSS-REFERENCE TO RELATED APPLICATIONS

This application is a continuation-in-part of and incorporates by reference U.S. patent application Ser. No. 17/695,347, which was filed on Mar. 15, 2022, which is a divisional of U.S. patent application Ser. No. 16/869,936, which was filed on May 8, 2020. The parent and prior application are incorporated herein, by reference, in their entirety.

BACKGROUND

The present application relates generally to the field of flush valves for toilets. More specifically, this application relates to flush valves for one-piece toilets that provide increased flush efficiency.

There is a constant desire and need within the field of toilets (and other water using devices) to become ever more efficient and use less water during each flush cycle, much like the ever increasing desire to improve fuel efficiency of internal combustion engines. Also similar to slight improvements in consumption in engines, even a slight improvement in flush efficiency for toilets can have a monumental impact on water conservation (i.e., reduction of consumption) given the number of toilets and flush cycles used daily (not just in the U.S., but on a global scale). Thus, there is constant pressure to find new ways to improve flush efficiency, even if only a slight improvement is recognized. Despite this constant pressure to increase flush efficiency and decrease water consumption, such improvements are easier said than done.

SUMMARY

At least one embodiment of the application relates to a toilet that includes a one-piece structure, a flush valve, and a seal. The one-piece structure includes a base and a tank integrally formed together. The base has a bowl and a fluid channel for delivering water to the bowl. The tank has an internal compartment for holding water, a bottom wall having an outlet opening to the fluid channel, and a retaining structure (e.g., a hood plate) located above the bottom wall and having an inner profile defining an inlet opening. The flush valve includes a valve body having an inner wall, which extends from a first end in fluid communication with the internal compartment to a second end in fluid communication with the fluid channel, and a locking flange, which extends radially outward from the inner wall and is retained between the retaining structure and the bottom wall in a locking position. The seal, which can have any suitable shape (e.g., annular) is disposed between the bottom wall and the locking flange.

At least one embodiment of the application relates to a toilet that includes an integral one-piece structure and a flush valve. The integral one-piece structure has a base having a bowl and a fluid channel in fluid communication with the bowl; a tank having an internal compartment configured to hold water; a wall disposed between a lower portion of the tank and an upper portion of the base to separate the internal compartment from the fluid channel, the wall having an opening fluidly connecting the internal compartment and the fluid channel; and a retaining structure disposed within the internal compartment. The flush valve has a valve body that includes an inner wall, which is disposed in the opening and extends from a first end in fluid communication with the internal compartment to a second end in fluid communication with the fluid channel, and a locking flange, which extends radially outward from the inner wall. The locking flange is retained between the retaining structure and the wall in a locking position. The toilet can also include a seal, which can be disposed between the locking flange and one of the wall or the retaining structure.

At least one embodiment of the application relates to a flush valve for use with a toilet having an integral one-piece tank and bowl. The flush valve includes a valve body having an inner wall. The inner wall extends between a first end, which is configured to be in fluid communication with a first internal compartment of the integral one-piece tank and bowl, and a second end, which is configured to be in fluid communication with a second internal compartment of the integral one-piece tank and bowl. The valve body also includes a locking flange that extends radially outward from the inner wall and is configured to be retained between a first wall and a second wall of the integral one-piece tank and bowl in a locking position of the valve body. One of the first and second walls is configured to separate the first and second internal compartments. The flush valve can also include a seal, which can be disposed between the locking flange of the valve body and one of the first and second walls of the integral one-piece tank and bowl.

At least one embodiment of the application relates to a method of installing a flush valve to a one-piece toilet having an integral base and tank. The method includes inserting a valve body of the flush valve into the tank of the one-piece toilet so that a locking flange of the valve body passes through an opening of a retaining structure of the toilet, wherein the locking flange has an outer profile that complements an inner profile of the retaining structure. The method includes rotating the valve body relative to the toilet to a locking position, in which the outer profile of the locking flange misaligns with the inner profile of the retaining structure, with the locking flange held between the retaining structure and a wall of the toilet, which interconnects the base and the tank.

BRIEF DESCRIPTION OF THE DRAWINGS

FIG. 10 is an image from a computational fluid dynamics model illustrating from the rear flow through a toilet, according to this application.

FIG. 11 is an image from a computational fluid dynamics model illustrating from a side flow through a portion of the toilet shown in FIG. 10.

DETAILED DESCRIPTION

Figure 1:
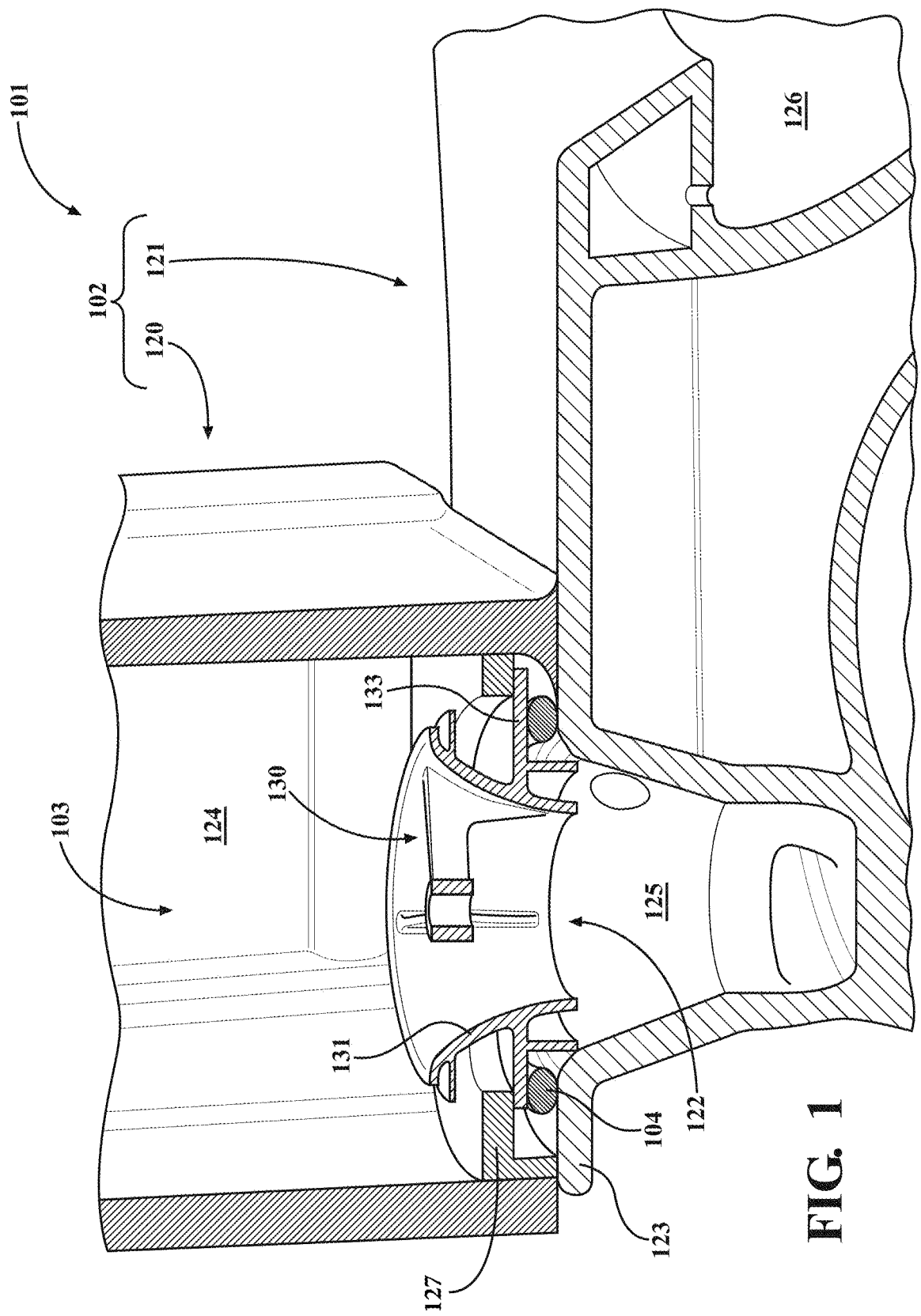
FIG. 1 is a partial cross sectional view of an exemplary embodiment of a toilet, according to this application.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are new flush valves and clamping/retaining/sealing systems and methods for one-piece toilets (i.e., toilets having the tank integrally formed with the base (e.g., bowl) so that the tank is not removable from the base) that provide increased efficiency (e.g., during each flush cycle). One-piece toilets present a challenge over two-piece toilets in installing the flush valve. For two-piece toilets, the flush valve can be coupled to the tank, such as using a nut that threads to the valve body underneath the tank, prior to attaching the tank to the base, so installation of the flush valve is relatively easy. However, for one-piece toilets, the flush valve is a "blind" installation, since the backside (e.g., lower part that is in the flush chamber of the base) of the flush valve is not visible from inside the tank during installation. Thus, Grimstad (U.S. Pat. No. 4,433,446) invented a system for coupling a flush valve to the toilet in a blind installation for one-piece toilets. However, this system requires an enlarged open volume on the base (e.g., bowl) side of the valve (as opposed to the tank side of the valve), and the inventors of this application found that this enlarged open volume on the base side of the valve induces a sudden fluidic expansion, which results in energy losses of the water passing from the tank to the bowl. As a result, more flush water (i.e., an increased volume of water) is passed from the tank to the bowl to overcome the energy losses and achieve proper flushing. The inventors of this application further found that the flush efficiency of one-piece toilets could be increased if the enlarged open volume could be eliminated (or even reduced).

The new flush valves and attachment systems/methods of this application are configured to provide increased flush efficiency for toilets having such flush valves by mounting to the toilet in a manner that can reduce or eliminate the open volume that induces a sudden fluidic expansion. Thus, the flush valves of this application are able to provide a proper flush (e.g., flush the same contents) using less water by reducing the amount of energy lost during each flush cycle of the toilet.

By way of example, the one-piece toilets of this application are able to achieve an increased flush efficiency by having an improved structure that, among other things, relocates the flush valve clamping/retaining feature(s) from below the seal (e.g., seal 104, seal 204, seal 304, etc.) to above the seal. This arrangement benefits the product designer/manufacturer in several regards. The toilet shown in FIG. 1 exemplifies a product solution that, while having a relatively smaller flow efficiency improvement over current systems, provides great value in solving an economic problem of how to construct/manufacture the toilet (it makes the impractical economically possible). For comparison, the toilet shown in FIG. 3 exemplifies the case of near ideal fluid transmission and functional efficiency where the fluid channels are "substantially the same" (e.g., channel 325 and opening 336). The toilets in this application, therefore, provide both practical economic solutions as well as gains in fluidic efficiencies, which can result in a reduction in water consumption during each flush cycle without reduced flushing performance of the toilets. The extent to which each is exercised within a given product can be tailored to the product objectives.

Figure 5:
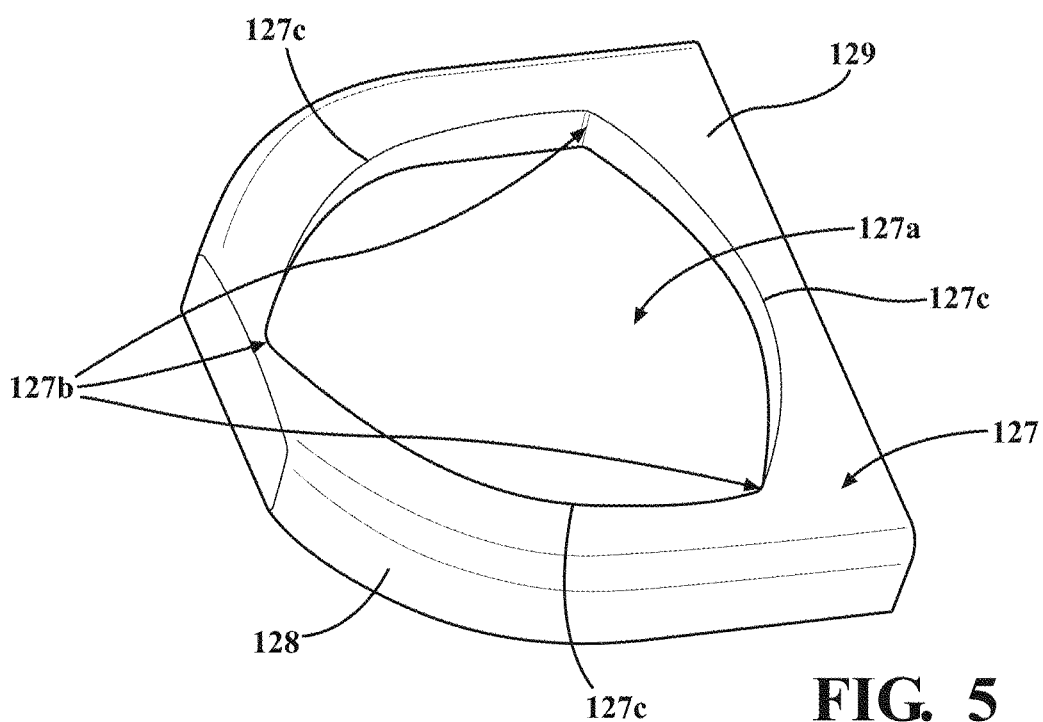
FIG. 5 is a perspective view of an exemplary embodiment of a retaining structure for use with a toilet, according to this application.

FIG. 1 illustrates an exemplary embodiment of a one-piece toilet 101 that includes a one-piece structure 102 having a tank 120 integrally formed with a base 121. An opening 122 (e.g., outlet opening) in a bottom wall 123 of the tank 120 fluidly connects an inner compartment 124 of the tank 120 and a fluid channel 125 in the base 121. The fluid channel 125 leads to a bowl 126 of the base 121, such that water introduced into the fluid channel 125 during a flush cycle is in turn introduced into the bowl 126. The structure 102 includes a retaining structure 127 (e.g., retaining plate, a hood plate, etc.) extending inwardly from a side wall (or bottom) of the tank 120. The retaining structure 127 is located above the bottom wall 123 such that there is a space (e.g., gap) between the retaining structure 127 and the bottom wall 123, where the space receives part of a flush valve 103, as discussed below. The retaining structure 127 has an outer profile (e.g., periphery), which can be tailored to an inner profile of the tank 120, and an inner profile that defines an opening 127a that is configured to receive the flush valve 103. As shown in FIG. 5, the opening 127a has a generally triangular shape having three points 127b spaced apart around the inner profile of the retaining structure 127. The term "generally triangular" encompasses triangles having straight sides and curved (e.g., convex, concave) sides.

Figure 4:
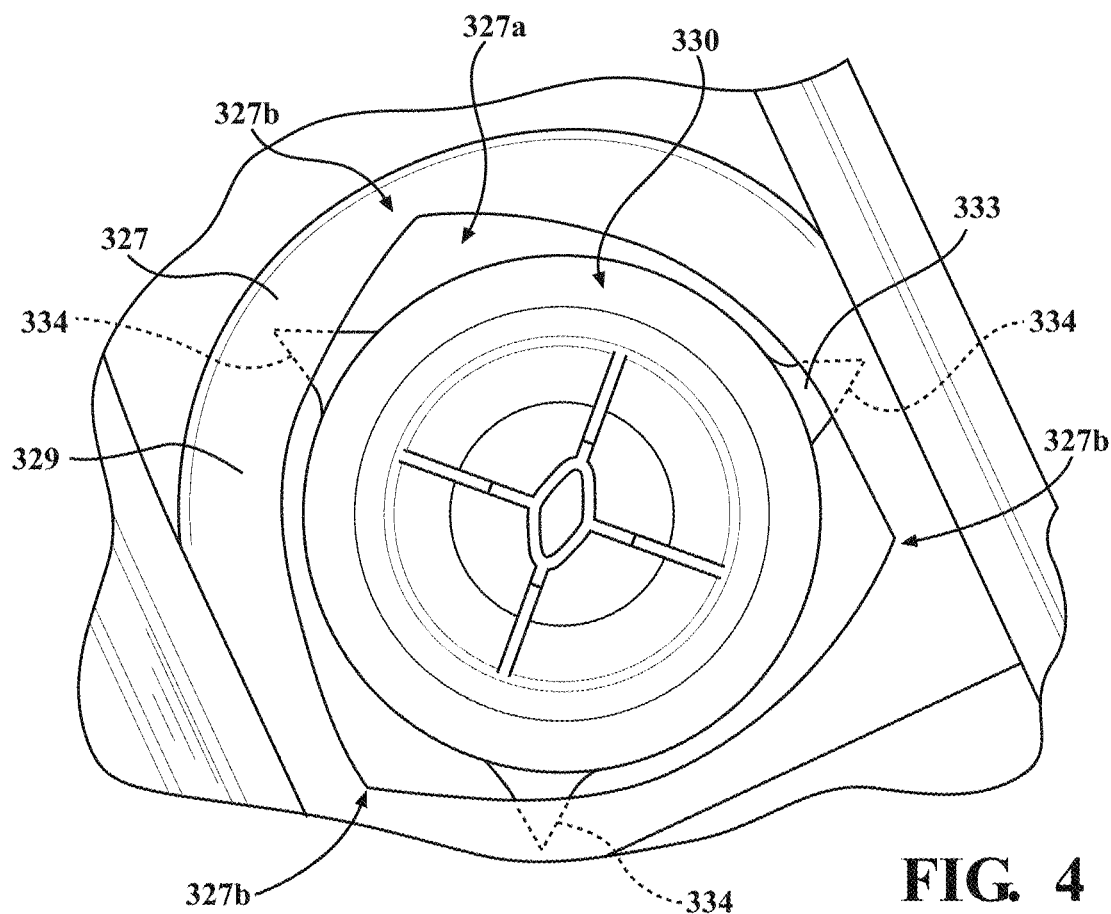
FIG. 4 is a perspective view of a portion of the toilet shown in FIG. 3.

The toilet 101 further includes a flush valve 103 that is configured to control the flow of water (e.g., meter an amount of water) during each flush cycle. As shown in FIG. 1, the flush valve includes a valve body 130 for use with, for example, a canister flush valve, which can be the same as or similar to the canister flush valve disclosed in U.S. Pat. No. 8,806,669 or other types of flush valves including other types of canister flush valves. The illustrated valve body 130 includes an inner wall 131 having an arcuate shape leading from the inner compartment 124 of the tank 120 to the fluid channel 125 to direct flush water in the inner compartment 124 to the fluid channel 125 during each flush cycle. The illustrated valve body 130 also includes a locking flange 133 (e.g., locking wall, etc.) that extends radially outward from an outside of the inner wall 131. The locking flange 133 has an outer profile that generally complements the shape of the inner profile of the retaining structure 127 in order to insert the locking flange 133 (and the valve body 130) through the opening 127a in the retaining structure 127 during installation (e.g., in an installation position of the valve body 130). Then, the valve body 130 is secured in place by the retaining structure 127 upon a predetermined angular rotation of the valve body 130 relative to the retaining structure 127 (e.g., rotating the valve body from the installation position to a locking position). For example, the valve body 130 can be configured to be secured (e.g., lock) after a rotation of between thirty (30) and ninety (90) degrees relative to the retaining structure 127. In the installation position, points 134 (e.g., tabs, projections, ears, etc.) along the outer profile of the locking flange 133 pass through the points 127*b* of the opening 127*a* in the retaining structure 127 to allow the locking flange 133 to be inserted into the opening 127*a*. In the locking position, the points 134 of the locking flange 133 are retained (e.g., secured, etc.) by the sides between the points 127*b* of the retaining structure 127, which define the opening 127*a*, to prevent the valve body 130 from being removed through the opening 127*a*. Although FIGS. 4 and 5 illustrate the valve body 130 and the retaining structure 127 as each having three points 134, 127*b*, respectively, it is noted that the flush valves of this application can have a fewer number or a greater number of points along the profiles, and that the number of points influences the rotation between the installation and locking positions for the valve body 130.

Also shown in FIG. 1, an annular seal 104, which can be configured as an O-ring, a gasket, or have any other suitable configuration, is disposed between the bottom wall 123 of the one-piece structure 102 and the locking flange 133 of the valve body 130 to seal a gap between the valve body 130 and the bottom wall 123 of the base 121. The seal 104 can be made of or include a compliant material, such that the seal 104 is compressible (e.g., compliant, elastic, etc.). During installation of the valve body 130, the locking flange 133 can be configured to compress the seal 104 elastically as the locking flange 133 is inserted through the opening 127*a* in the retaining structure 127. Such compression results in a better seal and generates reaction forces that help secure the valve body 130 in the locking position by biasing the locking flange 133 toward the retaining structure 127.

Figure 2:
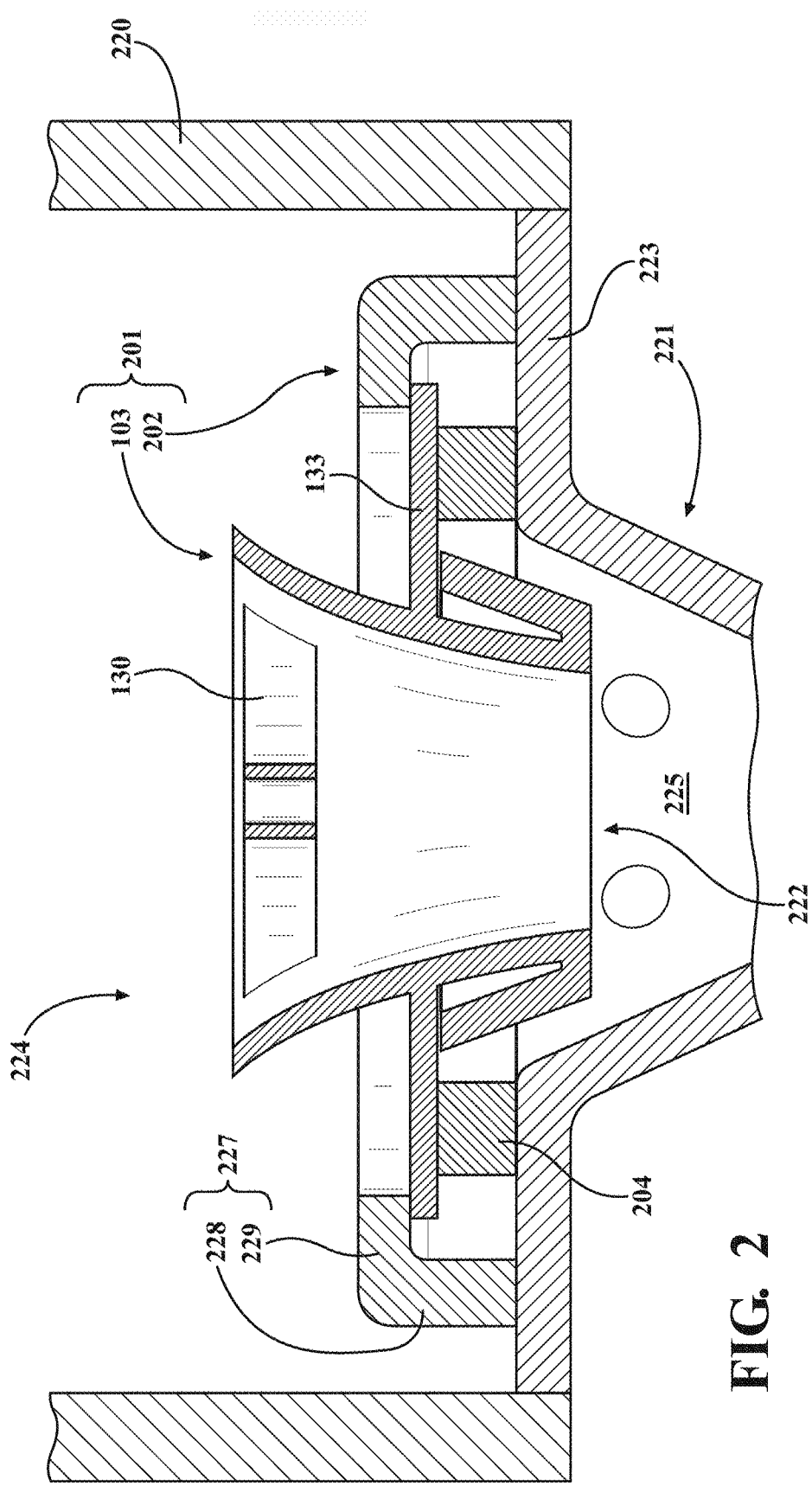
FIG. 2 is a cross sectional view of a portion of a toilet, according to this application.

FIG. 2 illustrates a portion of another exemplary embodiment of a one-piece toilet 201 having a flush valve 103 coupled to a one-piece structure 202. The one-piece structure 202 includes a tank 220 integrally formed with a base 221, where an opening 222 (e.g., outlet opening) in a bottom wall 223 of the one-piece structure 202 fluidly connects an inner compartment 224 of the tank 220 and a fluid channel 225 in the base 221.

A retaining structure 227, which can be integrally formed with the one-piece structure 202 or formed separately and coupled thereto, is provided with the toilet 201. The illustrated retaining structure 227 has an annular body 228, which extends upwardly from a top surface of the bottom wall 223 of the one-piece structure 202, and a flange 229, which extends inwardly from the body 228 and has an inlet opening for receiving the valve body 130. The flange 229 is located offset from and above the bottom wall 223 such that there is a space (e.g., gap) between the flange 229 and the bottom wall 223. An inner profile of the flange 229, which defines the inlet opening, is configured to receive and secure the locking flange 133 of the valve body 130 through a plurality of points (e.g., three points as shown in FIG. 5).

The space between the flange 229 of the retaining structure 227 and the bottom wall 223 of the structure 202 receives the locking flange 133 of the valve body 130, as discussed above, to retain the valve body 130 in a locking position. Also shown in FIG. 2, an annular seal 204 having a generally rectangular cross sectional shape is disposed between a bottom of the locking flange 133 and a top of the bottom wall 223.

Figure 3:
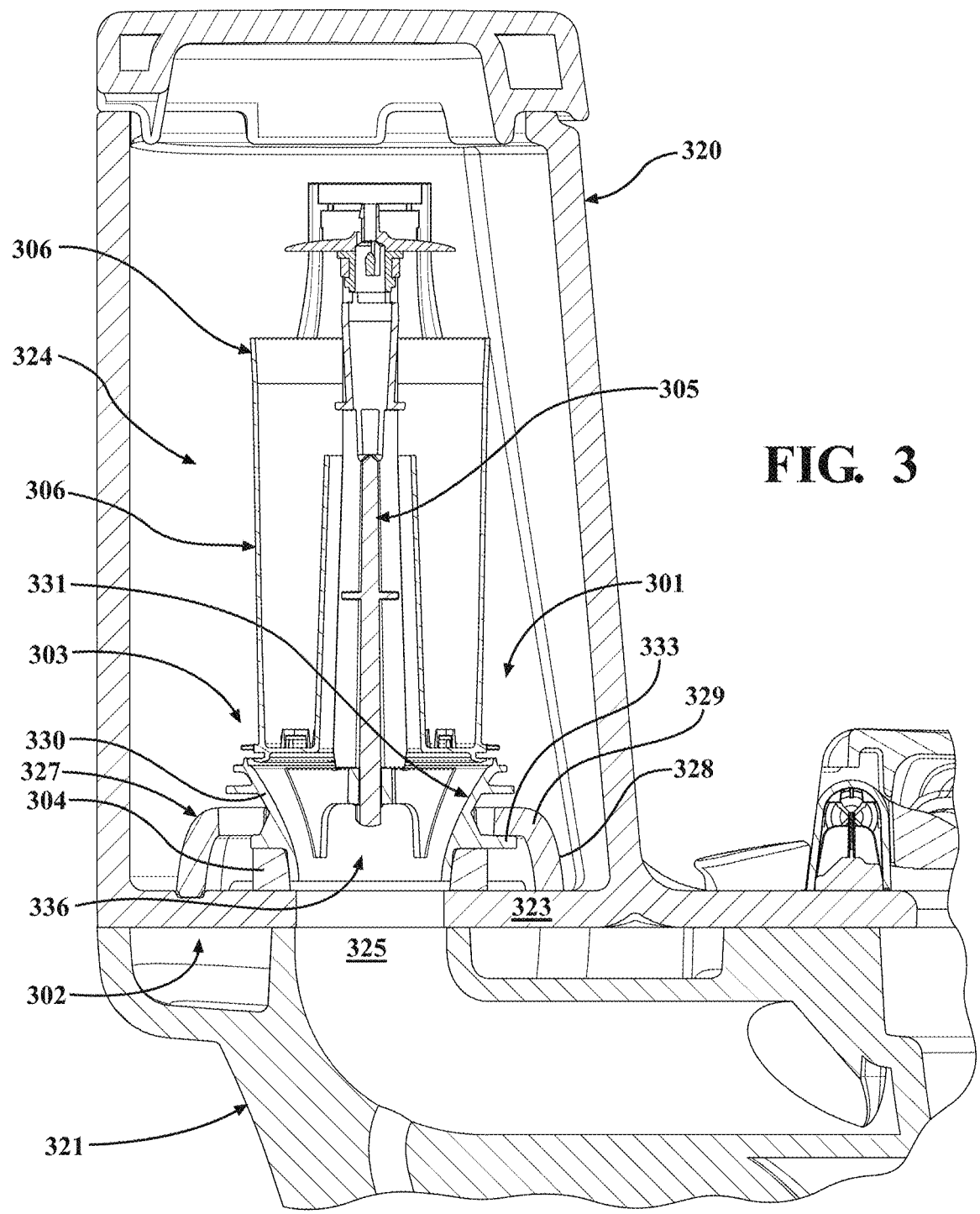
FIG. 3 is a cross sectional view of a portion of a toilet, according to this application.

FIGS. 3 and 4 illustrate part of another exemplary embodiment of a one-piece toilet 301 having a flush valve 303 coupled to a one-piece structure 302. FIG. 3 shows the one-piece structure 302 including a tank 320, a base 321, and a wall 323 integrally formed as a unitary element/structure. An inner compartment 324 of the tank 320 holds water therein and fluidly connects to a fluid channel 325 in the base 321 through an opening in the wall 323. Thus, the one-piece structure 302 has a construction similar to the one-piece structure 202 of FIG. 2 (or the one-piece structure 102 of FIG. 1), with an exception being the fluid channel 325 has a cross-sectional configuration (e.g., size, shape, etc.) that is substantially the same as the cross-sectional configuration of an outlet in fluid communication with an inlet of the fluid channel 325. The outlet can be associated with or part of a valve, as discussed below, and/or the one-piece structure, such as the opening in the wall 323 of the one-piece structure 302.

A valve regulates/controls the flow of water from the compartment 324 of the tank 320 to the fluid channel 325, such as during a flush cycle of the toilet. FIG. 3 shows a flush valve in the form of a canister type/style flush valve 303, although other types of flush valves can be employed using the one-piece toilets disclosed herein. The flush valve 303 includes a valve body 330 that couples to the structure 302 in a secured/installed position. The illustrated valve body 330 includes a wall 331 (e.g., inner wall) extending from an inlet (e.g., upper) end, which is configured to receive water such as during a flush cycle, to an outlet (e.g., lower) end, which is in fluid communication with the fluid channel 325. The outlet end either alone or in combination with the structure 302 define the configuration (e.g., size, shape, etc.) of an outlet opening 336 in fluid communication with the fluid channel 325. The wall 331 can have a tapered shape (e.g., frusto-conical, curved, etc.), such as shown in FIG. 3, or can have other shapes (e.g., straight). The wall 331 of the valve body (e.g., the outlet end thereof) can contact the wall 323 of the structure 302 (e.g., a top surface thereof). Alternatively, there can be a gap between wall 331 and the wall 323 with the seal 304 sealing the gap, as shown in FIG. 3. The seal 304 can be compressible, such as to apply a biasing force on a flange (e.g., locking flange) of the valve body 300 toward a portion of the retaining structure 327.

As shown in FIG. 3, the outlet opening 336 has a configuration (e.g., shape, size, etc.) that is substantially the same as the fluid channel 325. For example, a size (e.g., cross-sectional area) of the fluid channel 325 can be substantially the same as a size of the outlet opening 336. Thus, the feature(s) defining the outlet opening 336 (e.g., the outlet end of the wall 331, opening in the wall 323, inner diameter of the seal 304, any combination of these features, etc.) can have a size that is substantially the same as the size of the fluid channel 325. As used in this example, "substantially the same" means within a range of +/−15% of the size of the outlet opening of the valve body. Further, the configuration of the fluid channel 325 can be the same as the configuration of the outlet opening 336, such as within manufacturing tolerances. This arrangement advantageously eliminates the sudden fluidic expansion and resulting energy losses associated therewith during each flush cycle, as discussed herein in more detail.

Similar to the other valve bodies discussed herein, the valve body 330 includes a locking flange 333 for retaining the valve body in place in the toilet. As shown in FIG. 3, the retaining structure 327 retains the locking flange 333 between a flange 329 of the retaining structure 327 and the wall 323 of the structure 302 in a locking or installation position of the flush valve 303. The retaining structure 327 includes a body 328, which couples to the structure 302, such as the wall 323 separating the tank from the bowl. Alternatively, the flange 329 and/or the body 328 can couple directly to a wall 339 of the tank 320. The flange 329 of the retaining structure 327 includes an opening that receives the locking flange 333 of the valve body 330 during installation (e.g., in an uninstalled position). After the locking flange 333 is inserted beyond a bottom of the flange 329 (e.g., inserted below the bottom in FIG. 3), rotation of the valve body 330 (e.g., flush valve 303) relative to the structure 302 moves the locking flange 333 into a secured position with the structure 302. The bottom wall 323 of the structure 302 and the retaining structure 327 define a recess that receives the locking flange 333 and, as shown, the seal 304. The seal 304 may have an annular shape to extend around the outlet end of the valve body 330. As shown, the seal 304 seals between the valve body 330 and the wall 323.

Also shown in FIG. 3, the flush valve 303 includes a guide 305 (e.g., guide member), which couples to the valve body 300 such as at a lower end of the guide 305, and a float 306, which movably couples to the guide 305. The float 306 can carry a valve seal that engages (and seals) a valve seat of the valve body 330, which is disposed at the inlet end of the wall 331, in a closed position of the flush valve 303 to prevent water from flowing through the valve body 330 to the fluid channel 325. During a flush cycle, the float 306 moves along and relative to the guide 305 to an open position, in which the valve seal disengages from the valve seat of the valve body 330, permitting flush water to flow from within the tank 320 into the fluid channel 325 through the valve body 330.

FIG. 4 is a detail view showing the locking flange 333 of the valve body 330 in a locking position with the retaining structure 327 of the structure 302. Generally, the locking flange 333 has a shape that fits into an opening 327a in the retaining structure 327 during installation or in an uninstalled position, then after a predetermined rotation of the valve body 330 relative to the retaining structure 327, features secure and/or retain the locking flange 333 in place relative to the retaining structure 327. As shown in FIG. 4, the locking flange 333 has a generally triangular shape with three points 334 defining three corners of the triangle. The term "generally triangular" denotes that the sides between the three points 334 can be, but do not have to be, straight. The opening 327a in the flange 329 of the retaining structure 327 has a shape that receives the locking flange 333 during installation and secures the flange 329 in a locking position. As shown, the opening 327a includes or is defined by three points 327b with curved sides extending between each adjacent pair of points 327b. The curved sides advantageously secure and/or retain the points 334 of the locking flange 333 in the locking position while allowing the valve body 330, which is shown having a round or circular shape, to extend through the opening 327a to be in fluid communication with the fluid channel 325. During installation, the locking flange 333 is insertable through the opening 327a, such as with the three points 334 of the locking flange 333 aligned with three points 327b of the opening 327a. After the locking flange 333 is inserted beyond/below a bottom of the flange 329 (see FIG. 3), a predetermined angular rotation of the valve body 330 (e.g., flush valve 303) relative to the structure 302 moves the locking flange 333 into the secured position with the structure 302 (e.g., the flange 329 as shown in FIG. 4). For example, the flange 329 prevents a movement of the locking flange 333 in the direction toward the flange 329 when the two flanges 329, 333 are in contact. The seal 304 can be in compression in the locking position to impart a biasing force onto the locking flange 333 toward the upper flange of the retaining structure 327. Such biasing force can retain the valve body 330 in the locking position.

FIG. 5 shows an exemplary retaining structure 127, which is similar to the retaining structure 327 of FIG. 4. The retaining structures (e.g., structures 127, 327) can be integrally formed with the one-piece toilet structures disclosed herein, or can be formed separately and coupled to the one-piece toilet structures using any suitable process. The illustrated retaining structure 127 has a base 128 (e.g., body, wall, etc.), which forms a periphery having an open center. The base 128 can extend upwardly from a surface of the toilet when installed into or formed with the toilet. For example, the base 128 could extend up from a top surface of the wall 323 of the one-piece structure 302 of the toilet 301 shown in FIG. 3. Also shown in FIG. 5, a flange 129 of the retaining structure 127 extends inwardly from the base 128 and includes an inlet opening 127a shaped to receive and help retain a valve body. Thus, if installed into the toilet 301, the flange 129 would be located offset a distance above the bottom wall 323 such that the distance defines a space (e.g., gap) between a bottom of the flange 129 and a top surface of the bottom wall 323. This space receives a portion (e.g., locking flange) of a valve body and a seal, if provided. Also shown in FIG. 5, an inner profile of the flange 129, which defines the inlet opening 127a, has a shape that includes three points 127b with curved sides 127c extending between each adjacent pair of points 127b. Each illustrated side 127c curves outwardly (e.g., compared to a line through the two associated points 127b). Notably, the retaining structure 127 could include fewer or additional points 127b and sides 127c, where the retaining structure 127 (e.g., inlet opening 127b) receives and helps secure the flush valve (e.g., a locking flange of a valve body) in place through the geometry/shape (e.g., of the points and sides).

Figure 6:
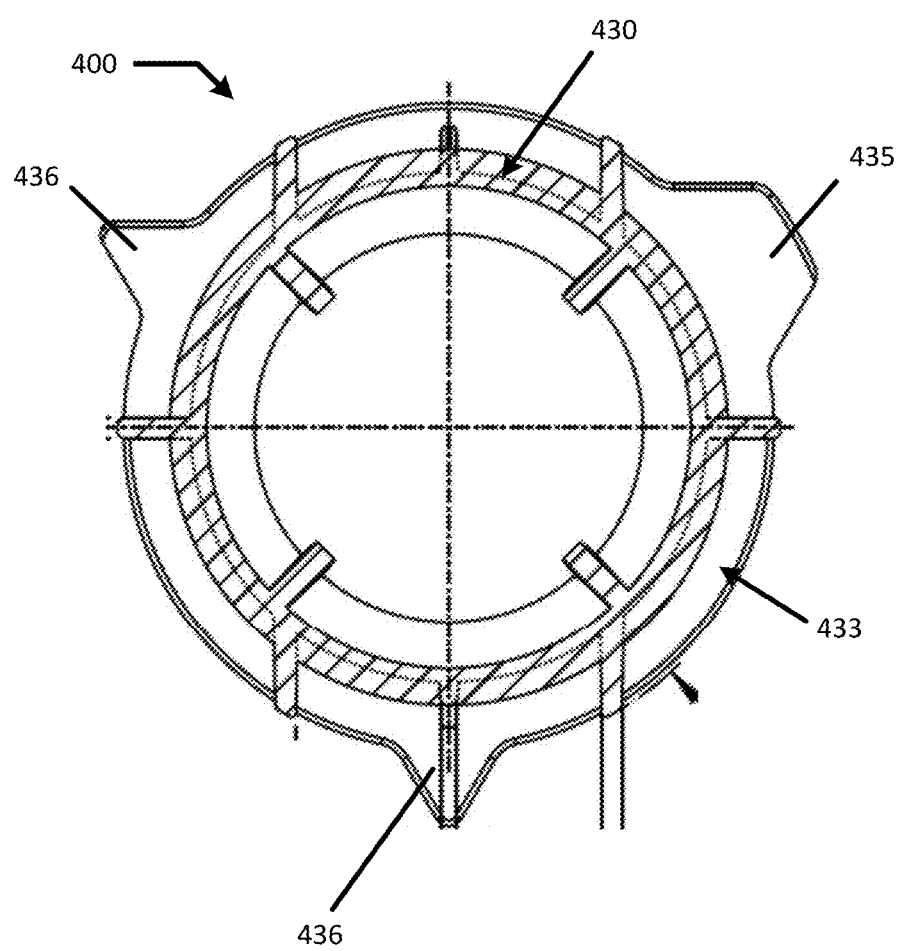
FIG. 6 illustrates a top view of a flush valve according to this application.

FIGS. 6-9 illustrate a flush valve 400 and a retaining structure 427 according to another exemplary embodiment of the present disclosure. FIG. 6 illustrates a flush valve 400 according to another embodiment of the present disclosure. The flush valve 400 is configured to control the flow of water (e.g., meter an amount of water) during each flush cycle. As shown in FIG. 6, the flush valve 400 includes a valve body 430. The valve body 430 may be the same as the valve body 130 referenced above with respect to FIG. 1. The valve body 430 may be used with a canister flush valve. The canister flush valve may include a mounting portion configured to mount the canister flush valve within a tank of the toilet. The mounting portion may further define a passageway configured to convey a flow of water from the tank of the toilet to a bowl of the toilet. The canister flush valve may further include a guide portion extending from the mounting portion. The guide portion may extend upward from the mounting portion into the tank of the toilet. The canister flush valve may include a float portion configured to move along (e.g., vertically) the guide portion during a flush cycle of the toilet. The float portion may have a substantially cup shaped body. During a flush cycle of the canister flush valve, a portion of water supplied to the tank may be received in the cup shaped body, the water received in the float portion may affect the buoyancy of the float, controlling a duration of the flush cycle. In other examples, the valve body 430 may be used with other types of flush valves.

The valve body 430 includes an inner wall having an arcuate shape leading from the inner compartment 124 of the tank 120 to the fluid channel 125 to direct flush water in the inner compartment to the fluid channel 125 during each flush cycle. The illustrated valve body 430 also includes a locking flange 433 (e.g., locking wall, etc.) that extends radially outward from an outside of the inner wall 131. In some examples, and as illustrated in FIG. 6 the locking flange 433 may have a generally triangular shape and include a reference tab 435 (e.g., first tab type, first shaped tab) and two standard tabs 436 (e.g., second tab type, second shaped tab). The reference tab 435 may have a first shape. The standard tab 436 may have a second shape. The first shape of the reference tab 435 and the second shape of the standard tab 436 may be different from one another. In some examples, the first shape may be a substantially trapezoidal shape and the second shape may be a substantially triangular shape. In some examples, the first shape may be larger than the second shape (e.g., the reference tab may be larger than the standard tab 436). For example, the first shape may extend further from the locking flange 433 than the second shape or the first shape may be wider than the second shape. The shape of the locking flange 433 may vary and additional or fewer reference tabs 435 and/or standard tabs 436 may be provided.

Figure 7:
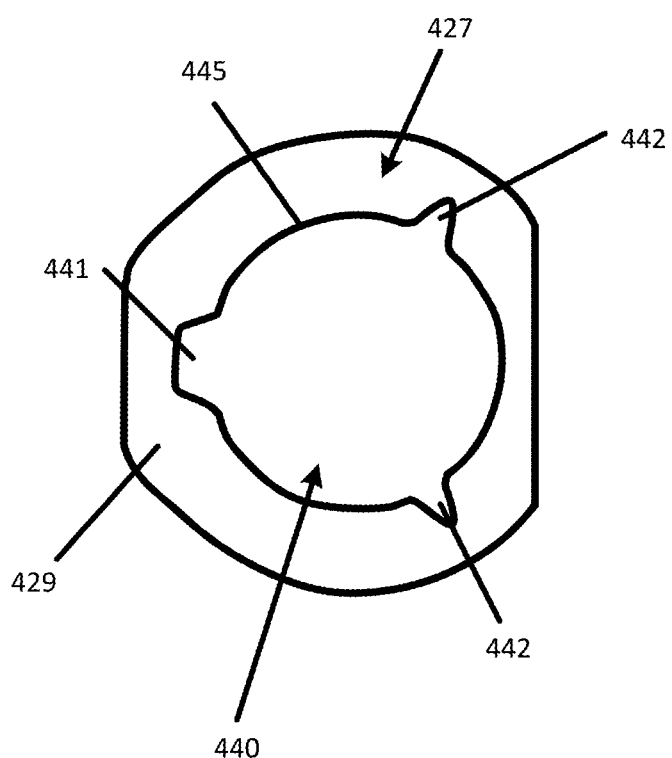
FIG. 7 illustrates a top view of a retaining structure according to this application.
Figure 8:
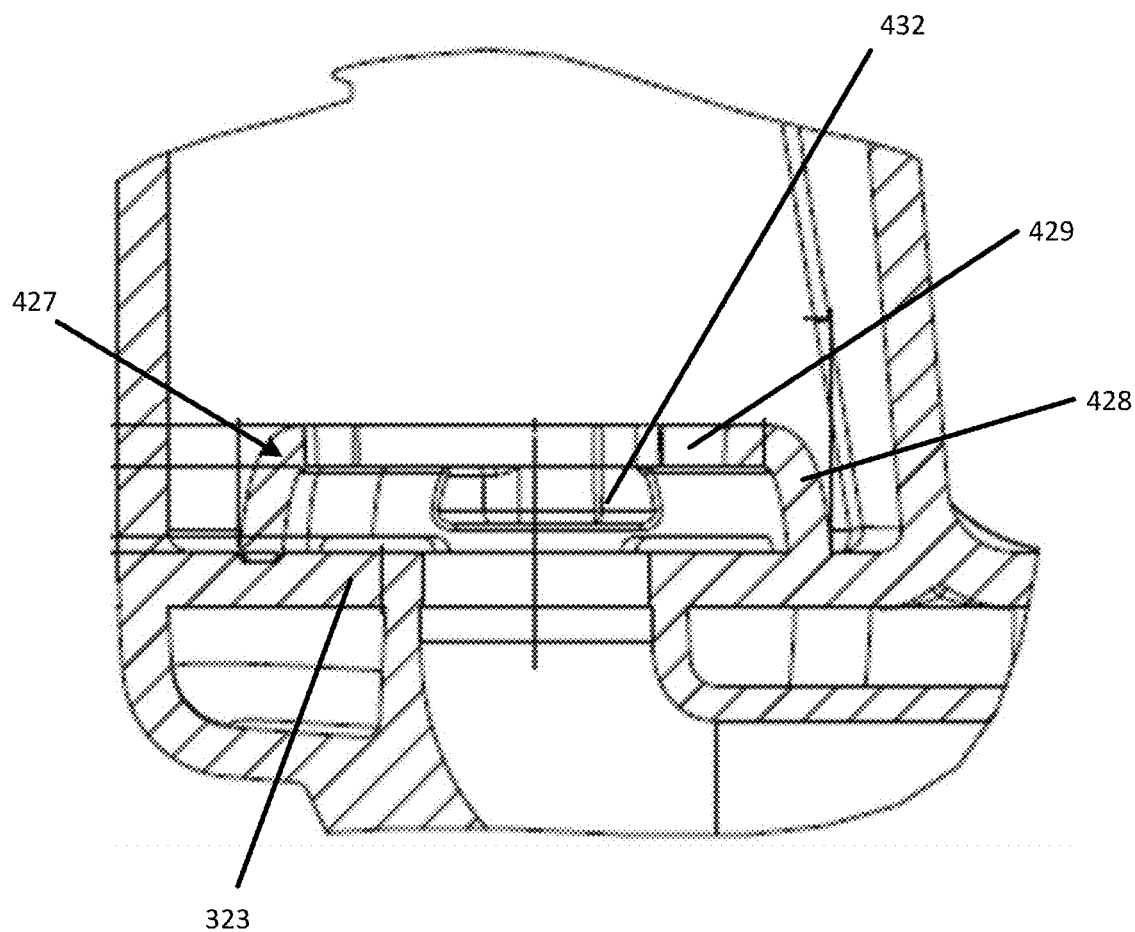
FIG. 8 illustrates a side view of the retaining structure shown in FIG. 7.

The locking flange 433 has an outer profile that generally compliments the shape of the inner profile of the retaining structure 427. FIGS. 7 and 8 illustrates a retaining structure 427 having an inner profile that compliments the outer profile of the valve 400. FIG. 7 illustrates a top view of the retaining structure 427 and FIG. 8 illustrates a side cross-sectional view of the retaining structure 427. The retaining structure 427 may be substantially similar to the retaining structures 327 and 127 described above. The retaining structure 427 may be integrally formed with the one-piece toilet structures disclosed herein or can be formed separately and coupled to the one-piece toilet structures using any suitable process. The retaining structure 427 includes a base 428 (e.g., body, wall, etc.), which forms a periphery having an open center. The base 428 can extend upwardly from a surface of the toilet when installed into or formed with the toilet. The retaining structure 427 further includes a flange 429 that extends inwardly from the base 428. The flange 429 includes an inlet opening 440 shaped to receive and help retain the valve body 430. Thus, if installed into the toilet 301, the flange 429 would be located offset a distance above the bottom wall 323 such that the distance defines a space or gap between a bottom of the flange 429 and a top surface of the bottom wall 323. In some examples, the flange 429 may extend inward from one or more side walls of the tank, to be offset a distance above the bottom wall, defining a space or gap between the flange 429 and the bottom wall 323. In examples where the flange 429 extends from a side wall of the tank, the retaining structure may not include a base 428. This space receives a portion (e.g., the locking flange) of the valve body 430 and a seal, if provided. An inner profile of the flange 429, which defines the inlet opening 440, has a shape that includes one or more points (e.g., recesses, indentations, etc.). The one or more points may include a reference point 441 and one or more standard points 442. In some examples, curved sides 445 extend between the reference point 441 and/or the one or more standard points 442. Each of the curved sides 445 may curve outwardly (e.g., as opposed to a line between two of the reference point 441 and/or the standard points 442). The retaining structure 427 may include fewer or additional points (e.g., reference points 441 and/or standard points 442) and fewer or additional sides 444, where the retaining structure 427 (e.g., inlet opening 440) receives and helps secure the flush valve 400 (e.g., locking flange 433) in place through the geometry/shapes (e.g, of the points and sides).

The locking flange 433 has an outer profile that generally compliments the shape of the inner profile of the retaining structure 427 in order to insert the locking flange 433 (and valve body 430) through the opening 440 in the retaining structure 427 during installation (e.g., in an installation position of the valve body 430). In the installation position of the valve body 430 the reference tab 355 of the locking flange 433 aligns with the reference point 441 of the inlet opening 440 and each of the one or more standard tabs 356 aligns with a standard point 442 of the inlet opening 440. The reference tab 355 must be aligned with the reference point 441 of the inlet opening 440 in order for the valve body 430 (e.g., locking flange 433) to pass through the inlet opening 440. Accordingly, an orientation of the valve 400 relative to the retaining structure 427 at an installation position may be controlled using the reference tab 435 and the reference point 441. Then, the valve body 430 is secured in place by the retaining structure 427 upon a predetermined angular rotation of the valve body 430 relative to the retaining structure 427 (e.g., rotating the valve body from the installation position to a locking position). For example, the valve body 430 can be configured to be secured (e.g., lock) after a rotation of between (30) and ninety (90) degrees relative to the retaining structure 427.

In some examples, the retaining structure 427 may further include a stop 432 disposed between flange 429 of the retaining structure 427 and the bottom wall 323. The stop 432 may protrude from one of the bottom wall 323, the base 428, or the flange 429 into the space or gap between the bottom of the flange 429 and the top surface of the bottom wall 323. The stop 432 may be disposed between the flange 429 and the bottom wall so as to contact one of the reference tab 355 or the standard tab 356 in the installation position of the locking flange 433. Accordingly, the stop 432 may prevent rotation of the locking flange 433 relative to the retaining structure 427 in one direction in the installation position. Accordingly, the direction of rotation of the locking flange 433 relative to the retaining structure from the installation position to the locking position may be controlled. Further, the stop 432 may be disposed between the flange 429 and the bottom wall 323 so as to contact one of the reference tab 355 or the standard tab 356 in the locking position. The stop 432 may be configured prevent additional rotation of the valve body 430 relative to the retaining structure 427 when the valve body has been rotated to the locking position. Accordingly, an orientation of the valve 400 with respect to the retaining structure 427 at the locking position may be controlled. In some examples, the retaining structure may include two or more stops 432. For example, a first stop may contact the reference tab 435 or the standard tab 436 in the installation position and a second stop may contact the reference tab 435 or the standard tab 436 in the locking position. In some examples, as illustrated in FIG. 9, the stop 432 may be configured to contact a standard tab 356 in an installation position and the reference tab 435 in the locking position.

In the installation position, a reference tab 435 and a standard tab 436 along the outer profile of the locking flange 433 pass through a reference point 441 and a standard point 442, respectively, of the inlet opening 440 to allow the locking flange 433 to be inserted into the inlet opening 440. In the locking position, the reference tab 435 and the standard tab 436 of the locking flange 433 are retained (e.g., secured, etc.) by the sides (e.g., sides 445) between the reference point 441 and/or one or more standard points 442, which define the opening 440 to prevent the valve body 430 from being removed through the opening 440. Although FIGS. 6 and 9 illustrate the valve body 430, and more specifically, the locking flange 433 having a single reference tab 435 and two standard tabs 436, the number of reference tabs and the number of standard tabs may vary. The points (e.g., reference points 441 and standard points 442) of the opening 440 in the retaining structure 427 may correspond to the reference tab 435 and the standard tab(s) 436 of the locking flange 433. For example, the valve 400 as illustrated in FIG. 6 includes a reference tab 435 and two standard tabs 436. Accordingly, the valve 400 may be used with the retaining structure 427 as illustrated in FIGS. 7 and 8 including a reference point 441 and two standard points 442.

Figure 9:
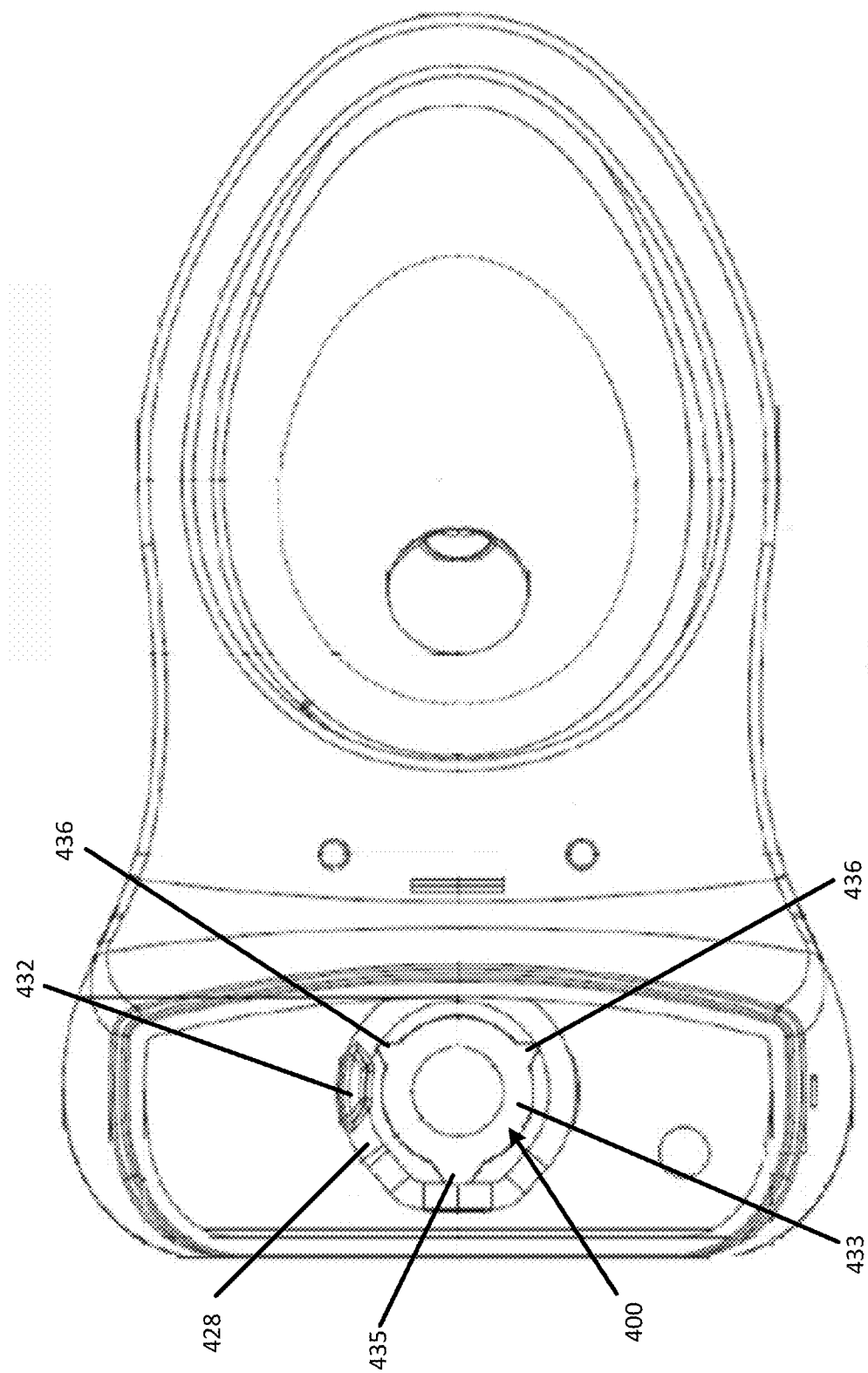
FIG. 9 illustrates a toilet including a cross-sectional view of a retaining structure and flush valve according to this application.

FIG. 9 illustrates a toilet including a cross-sectional view of a valve 400 disposed within a retaining structure 427 according to an embodiment of the present disclosure. As illustrated, the flange 429 of the retaining structure 427 is cut away so that the valve 400 can be seen within the retaining structure 427. As illustrated in FIG. 9, the valve 400 is in an installation position with respect to the retaining structure 427. As illustrated, in the installation position, the stop 432 is configured to contact one of the standard tabs 436, preventing the valve 400 from being rotated counter-clockwise with respect to the retaining structure 427. From the installation position, the valve 400 may be rotated clockwise until the reference tab 435 contacts the stop 432. When the reference tab contacts the stop 432, the valve 400 may be in the locking position. Accordingly, orientation of the valve 400 with respect to the retaining structure 427 can be controlled in both an installation and a locking position.

FIGS. 10 and 11 illustrate fluid streamlines SL (e.g., velocity streamlines) representing flow through a valve body of a flush valve (e.g., above plane P) and into a fluid channel of a one-piece structure not having a sudden expansion area, such as, like the structure shown in FIG. 3, that leads to the bowl of the toilet. The streamlines SL were generated by a computational fluid dynamics (CFD) computer model. The streamlines SL of the CFD show that there is very little to no energy loss in the flow from the valve body VB (e.g., the valve body 330, the outlet opening 336), which is above the plane P, into the fluid channel FC (e.g., fluid channel 325), which is below the plane P, since the velocities of the streamlines SL above plane P are about 1.50 m/s and the velocities of the streamlines SL below plane P are about 1.50 m/s. Thus, there is little to no loss in velocity of the fluid passing from the valve to the fluid channel of the toilet. The CFD model further shows that there is little to no energy loss of the fluid flowing through the fluid channel (e.g., the velocities remain fairly consistent). It is noted that the plane P in FIG. 10 illustrates the approximate location at the outlet opening (e.g., outlet opening 336) fluidly connecting the valve body and the fluid channel, so above the plane P corresponds to flow through a valve body (e.g., the valve body 330 shown in FIG. 3) and below the plane P corresponds to flow through a fluid channel (e.g., the fluid channel 325). Although the velocities of the streamlines of the CFD drop upon entering the bowl B and in certain locations within the trapway TP, as shown in FIGS. 10 and 11, the relative constant velocities from the valve body into and through the fluid channel show the configuration/design retains more energy for the flush cycle to flush contents in the bowl from the bowl.

Figure 13:
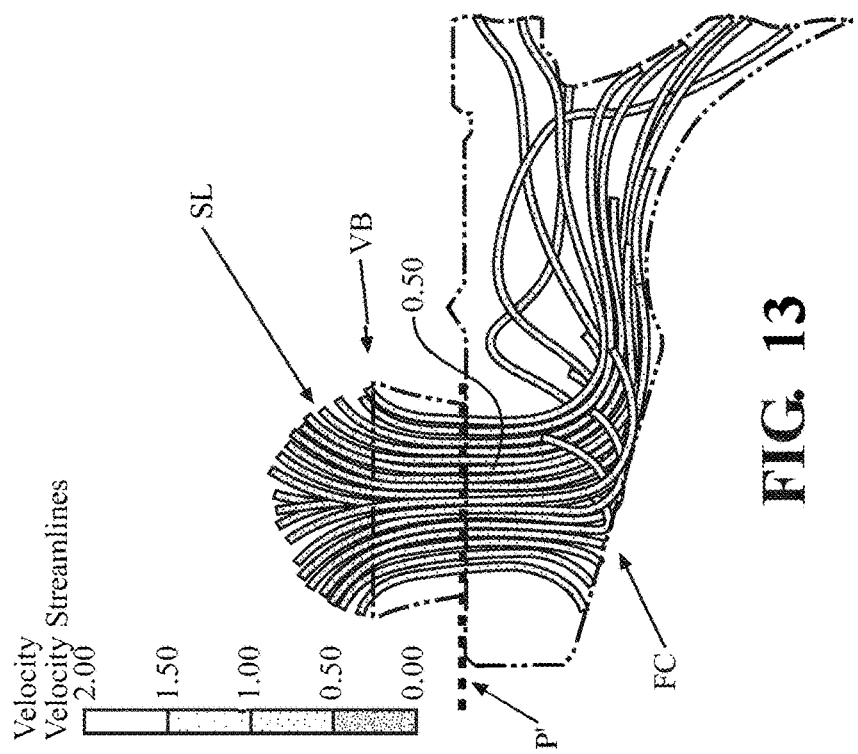
FIG. 13 is an image from a computational fluid dynamics model illustrating from a side flow through a portion of the toilet shown in FIG. 12.
Figure 12:
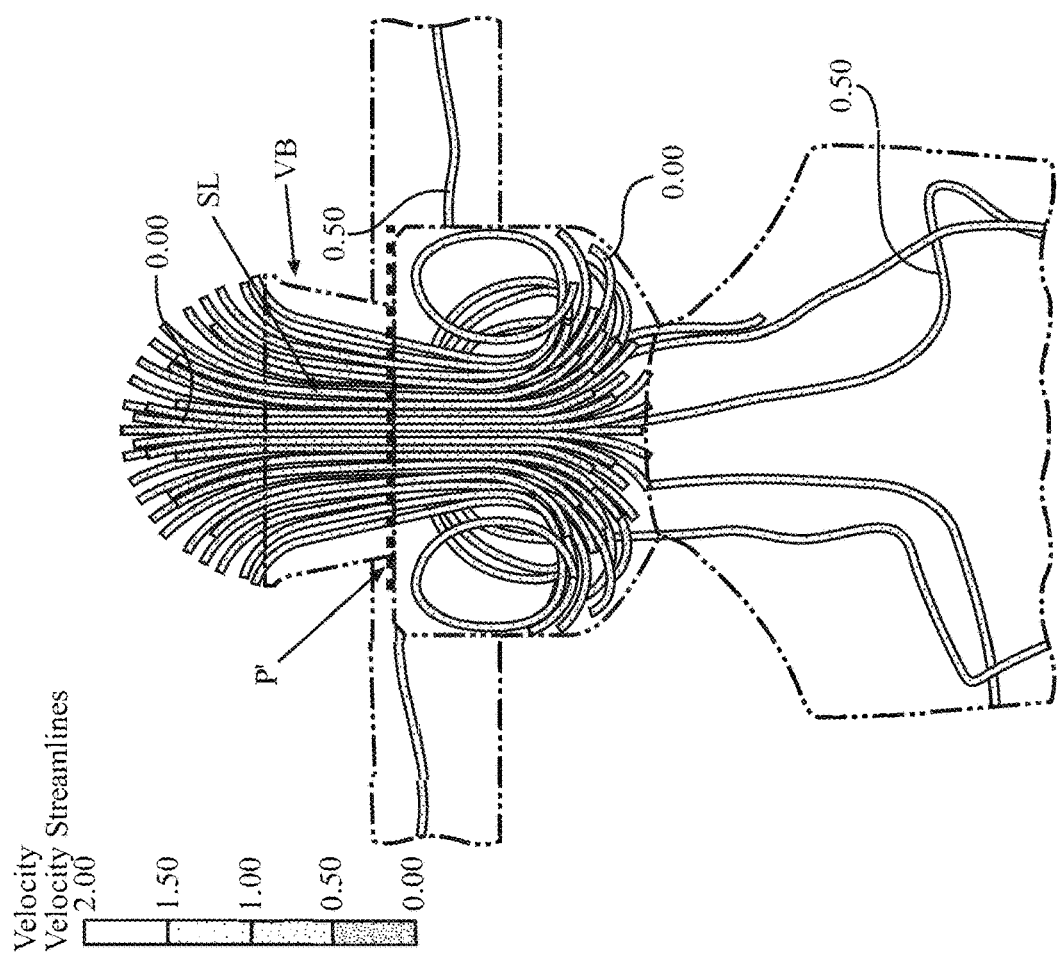
FIG. 12 is an image from a computational fluid dynamics model illustrating from the rear flow through a toilet having a sudden expansion from the outlet of the valve body to the fluid channel to the bowl.

For comparison and contrast to the toilet shown in FIGS. 10 and 11, FIGS. 12 and 13 illustrate fluid streamlines SL representing flow through a valve body VB of a flush valve (e.g., above plane P') and into a fluid channel FC of a one-piece structure that has a sudden expansion area SEA (e.g., an open area that is enlarged compared to the outlet in the valve body). FIGS. 12 and 13 show that the velocities of the streamlines SL below plane P' (entering the fluid channel) have dropped to 0.50 m/s and slower due to the sudden expansion area SEA. FIGS. 12 and 13 also show recirculation is occurring (i.e., the streamlines are recirculating) within the fluid channel downstream from the plane P'. The recirculation induces a drop in fluid velocity resulting in a loss of energy and a decrease in efficiency of the toilet during the flush cycle.

Figure 14:
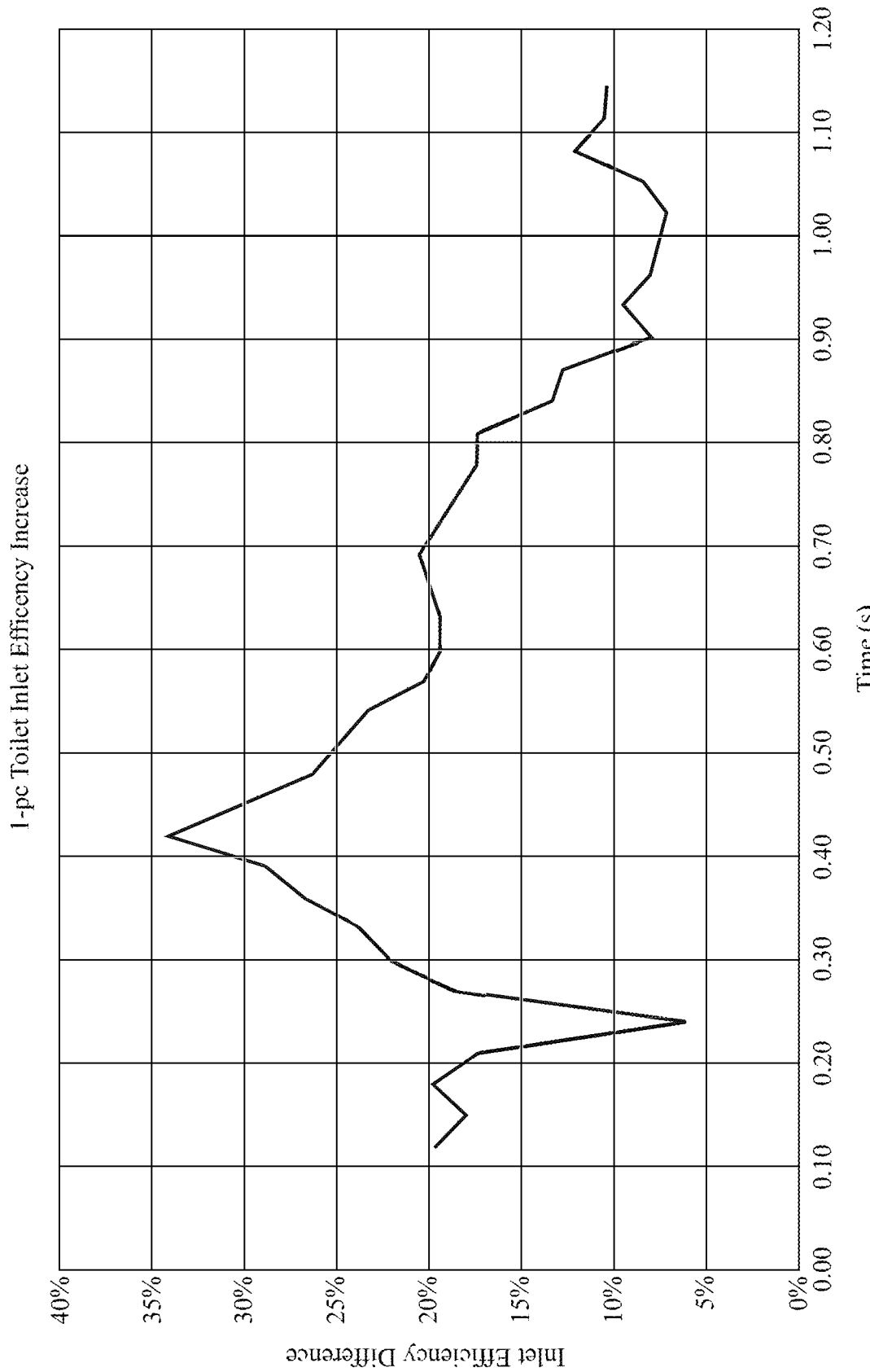
FIG. 14 is a graph showing the efficiency increase of the toilet shown in FIGS. 10 and 11 over the toilet shown in FIGS. 12 and 13.

FIG. 14 is a graph illustrating the efficiency increase of the toilet shown in FIGS. 10 and 11 over the toilet shown in FIGS. 12 and 13. As shown, the efficiency increase varies over time from a low of about 6% (six percent) efficiency increase at a time of about 0.24 s to a high of about 34% (thirty-four percent) efficiency increase at a time of about 0.42 s. Notably, the toilet shown in FIGS. 10 and 11 is more efficient over the entire flush cycle (i.e., over the entire timeline shown on the graph). This efficiency increase is measured approximately at the inlet of the fluid channel (e.g., at plane P in FIGS. 10 and 11, at plane P' in FIG. 13).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the valves and valve components/elements, as shown in the various exemplary embodiments, are illustrative only. Additionally, any element disclosed in one embodiment may be incorporated or utilized with any other embodiment disclosed herein. For example, each stem (e.g., stem assembly), stem adapter, screw, O-ring, plug (e.g., plug assembly) described herein may be incorporated into any other embodiment of this application. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A toilet, comprising:
an integral, one piece structure comprising:
a base having a bowl and a fluid channel in fluid communication with the bowl;
a tank having an internal compartment configured to hold water;
a wall disposed between a lower portion of the tank and an upper portion of the base to separate the internal compartment from the fluid channel, the wall having an opening fluidly connecting the internal compartment and the fluid channel; and
a retaining structure disposed within the internal compartment;
a flush valve comprising a valve body comprising:
an inner wall disposed in the opening and extending from a first end in fluid communication with the internal compartment to a second end in fluid communication with the fluid channel, and
a locking flange including a reference tab having a first shape and a standard tab having a second shape, the locking flange extending radially outward from the inner wall, wherein the locking flange is retained between the retaining structure and the wall in a locking position; and
a seal disposed between the locking flange and one of the wall or the retaining structure.

2. The toilet of claim 1, wherein the reference tab is larger than the standard tab.

3. The toilet of claim 1, wherein the reference tab has a substantially trapezoidal shape and the standard tab has a substantially triangular shape.

4. The toilet of claim 3, wherein the locking flange includes two or more standard tabs.

5. The toilet of claim 1, wherein the locking flange carries the seal, wherein the seal is compressed between the locking flange and the wall in the locking position.

6. The toilet of claim 1, wherein the seal has an annular shape, is separate from the locking flange, and is compressed between the locking and the wall in the locking position.

7. The toilet of claim 1, wherein the locking flange has an outer profile that complements an inner profile of the retaining structure so that the locking flange is insertable through an inlet opening defined by the inner profile of the retaining structure in an installation position.

8. The toilet of claim 7, wherein the inner profile includes a reference point and a standard point that align with the reference tab and the standard tab in the installation position, and wherein the reference point and the standard point misalign with the reference tab and the standard tab of the outer profile in the locking position.

9. The toilet of claim 8, wherein the retaining structure comprises a flange extending from a side wall of the tank and a stop disposed between the flange of the retaining structure and the wall disposed between a lower portion of the tank and an upper portion of the base, wherein the locking flange and the seal are retained between the flange of the retaining structure and the wall in the locking position, and wherein the stop is configured to contact one of the reference tab or the standard tab in the locking position.

10. The toilet of claim 9, wherein the stop is configured to prevent rotation of the locking flange relative to the retaining structure in one direction in the installation position.

11. The toilet of claim 8, wherein the retaining structure comprises:
a base extending upwardly from the top of the wall;
a flange extending radially inward from the base; and
a stop disposed between the flange of the retaining structure and the wall, wherein the locking flange and the seal are retained between the flange of the retaining structure and the wall in the locking position, and
wherein the stop is configured to contact one of the reference tab or the standard tab in the locking position.

12. The toilet of claim 11, wherein the stop is configured to prevent rotation of the locking flange relative to the retaining structure in one direction in the installation position.

13. A flush valve for use with a toilet having an integral one piece tank and bowl, the flush valve comprising:
a valve body comprising:
an inner wall extending between a first end, which is configured to be in fluid communication with a first internal compartment of the integral one piece tank and bowl, and a second end, which is configured to be in fluid communication with a second internal compartment of the integral one piece tank and bowl, and
a locking flange including a reference tab having a first shape and a standard tab having a second shape, the locking flange extending radially outward from the inner wall and being configured be retained between a retaining structure including a first wall and a second wall of the integral one piece tank and bowl in a locking position of the valve body,
wherein one of the first and second walls is configured to separate the first and second internal compartments; and
a seal disposed between the locking flange and of the valve body and one of the first and second walls of the integral one piece tank and bowl.

14. The flush valve of claim 13, wherein the reference tab is larger than the standard tab.

15. The flush valve of claim 13, wherein the locking flange includes two or more standard tabs.

16. The flush valve of claim 13, wherein the locking flange has an outer profile that complements an inner profile of the retaining structure so that the locking flange, is insertable through an inlet opening defined by the inner profile of the retaining structure in an installation position.

17. The flush valve of claim 16, wherein one of the reference tab or the standard tab is configured to contact a stop disposed between the first wall and the second wall preventing rotation in one direction in the installation position.

18. The flush valve of claim 16, wherein one of the reference tab or the standard tab is configured to contact a stop disposed between the first wall and the second wall preventing rotation in one direction in the locking position.

19. A toilet, comprising:
an integral, one piece structure comprising:
a base having a bowl and a fluid channel;
a tank having an internal compartment configured to hold water;
a wall disposed between a lower portion of the tank and an upper portion of the base; and
a retaining structure;
a flush valve comprising a valve body comprising:
an inner wall extending between a first end and a second end, and
a locking flange including a reference tab having a first shape and a standard tab having a second shape, wherein the locking flange is configured to be retained between the retaining structure including a first wall and a second wall of the tank and bowl in a locking position of the valve body.

20. The toilet of claim 19, wherein the reference tab and the standard tabs have different shapes.

* * * * *

UNITED STATES PATENT AND TRADEMARK OFFICE
CERTIFICATE OF CORRECTION

| | |
|---|---|
| PATENT NO. | : 12,163,322 B2 |
| APPLICATION NO. | : 17/876177 |
| DATED | : December 10, 2024 |
| INVENTOR(S) | : Daniel N. Halloran et al. |

It is certified that error appears in the above-identified patent and that said Letters Patent is hereby corrected as shown below:

In the Claims

Claim 19, Column 15, Line 17 "between a lower" should be replaced with --between the lower--

Signed and Sealed this
Eighteenth Day of November, 2025

John A. Squires
*Director of the United States Patent and Trademark Office*